J. C. TOWELL.
COTTON CHOPPER.
APPLICATION FILED MAY 6, 1911.

1,025,935.

Patented May 7, 1912.

Witnesses
Frank A. Fahle
May Layden

Inventor
Jesse C. Towell,
by Brad s Hood
Attorneys.

UNITED STATES PATENT OFFICE.

JESSE C. TOWELL, OF MUNCIE, INDIANA, ASSIGNOR OF ONE-HALF TO ARTHUR H. TOWELL, OF MUNCIE, INDIANA.

COTTON-CHOPPER.

1,025,935. Specification of Letters Patent. Patented May 7, 1912.

Application filed May 6, 1911. Serial No. 625,550.

*To all whom it may concern:*

Be it known that I, JESSE C. TOWELL, a citizen of the United States, residing at Muncie, in the county of Delaware and State of Indiana, have invented a new and useful Cotton-Chopper, of which the following is a specification.

The object of my invention is to produce a simple apparatus by means of which plants of various kinds may be chopped or cut down, the mechanism being of such character as to be at all times under control of the operator so that selected plants may be allowed to stand.

The accompanying drawings illustrate my invention.

Figure 1:
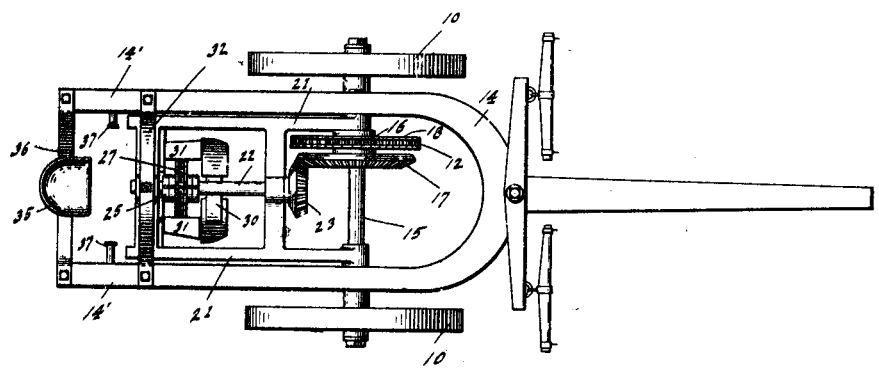
Figure 2:
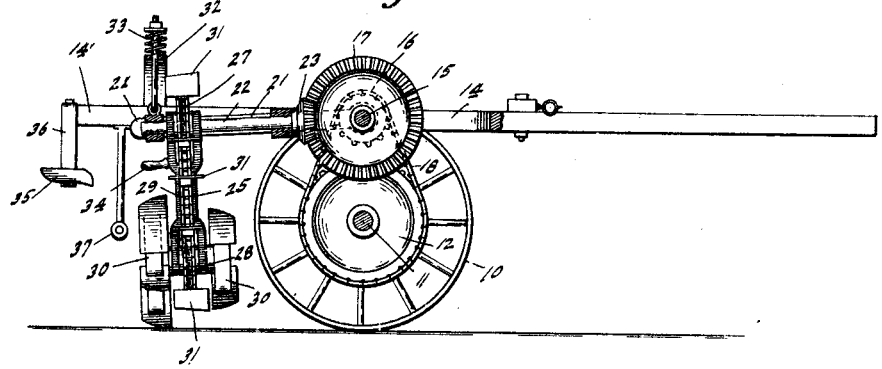
Figure 3:
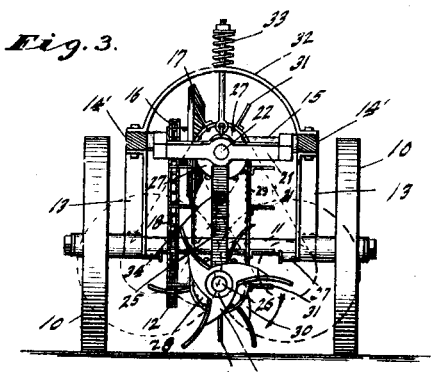

Figure 1 is a plan; Fig. 2 a central vertical section; and Fig. 3 a rear elevation.

In the drawings, 10 10 indicate suitable traction wheels connected by a shaft 11 carrying a sprocket wheel 12. Journaled upon shaft 11 are two brackets 13, 13 which, at their upper ends, support a main frame 14 having a pair of rearwardly projecting arms 14', 14'. Mounted in the arms 14' substantially immediately above the shaft 11, is a pin or bar 15 upon which is journaled a sprocket wheel 16 to which is secured a bevel gear 17. The sprocket chain 18 passes over the two gears 12 and 16. Pivotally supported at its forward end upon rod 15 is a chopper frame 21 which lies between the rearwardly projecting arms 14' of the main frame. Journaled in frame 21 is a longitudinal shaft 22 which is provided at its forward end with a bevel pinion 23 meshing with gear 17. Pivotally supported upon shaft 22 and depending therefrom is a supplemental chopper frame 25 which, at its lower end, carries a chopper shaft 26. Shaft 22 carries a sprocket wheel 27 and shaft 26 carries a sprocket wheel 28; over these two sprocket wheels passes a driving chain 29 which may also be equipped with chopper blades 31. The projecting ends of the chopper shaft 26 are provided with rotary chopper wheels 30, 30. Carried by the rearwardly projecting arms 14' is an arch 32 which forms a support for the lower end of a spring 33, the upper end of said spring being connected to and supporting the chopper frame 21 and associated parts, the arrangement being such that the spring 33 supports practically the entire weight of the free rear end of the chopper frame so that, with comparatively little exertion, the chopper frame 21 may be swung up and down so as to raise and lower the choppers relative to the ground. Projecting rearwardly from the supplemental chopper frame 25 is a handle 34 by means of which said supplemental chopper frame may be swung from side to side and the main chopper frame may at the same time be raised or lowered. Any suitable seat 35 for the operator may be supported by suitable hangers 36 from the rear ends of the arms 14' of the main frame, and suitable foot rests 37 may also be provided.

In operation the apparatus, when driven over the ground, will cause rotation of the chopper wheels 30 and movement of the chopper blades 31, at high speed. The operator, sitting in the seat 35 and grasping handle 34 may, by looking forwardly through the chopper frame and the main frame, determine the particular plants which are to be destroyed or saved and, by proper manipulation of handle 34, cause the chopper blades to produce the desired results.

I claim as my invention:

1. A plant chopper comprising a main transportable vehicle, a main chopper frame pivotally mounted thereon on a transverse axis, a supplemental chopper frame pivotally mounted on the main chopper frame on a longitudinal axis, a rotary chopper carried by the lower end of the supplemental chopper frame, a spring supporting a portion of the weight of the main and supplemental chopper frames, and means for rotating the chopper.

2. A plant chopper comprising a main transportable vehicle, a rearwardly extending main chopper frame pivotally mounted thereon on a transverse axis to swing independent of the main vehicle frame, a supplemental chopper frame pivotally mounted on the rearward extension of the main chopper frame on a longitudinal axis, and a rotary chopper carried by the lower end of the supplemental chopper frame.

3. A plant chopper comprising traction wheels, a main frame carried by said traction wheels, a main chopper frame pivotally mounted on the main frame on a transverse axis, a supplemental chopper frame pivotally mounted on the main chopper frame on a longitudinal axis, a rotary chopper carried by the lower end of the supplemental chopper frame, intermediate gearing between the traction wheels and rotary chopper, and a spring for supporting a portion of the weight of the main chopper frame and parts carried thereby.

4. A plant chopper comprising traction wheels, a main frame carried by said traction wheels, a main chopper frame pivotally mounted on the main frame on a transverse axis, a supplemental chopper frame pivotally mounted on the main chopper frame on a longitudinal axis, a rotary chopper carried by the lower end of the supplemental chopper frame, a sprocket wheel connected to said rotary chopper, an intermediate sprocket wheel between said first mentioned sprocket wheel and the traction wheels, a sprocket chain carried by said two sprocket wheels and provided with chopper blades, and intermediate gearing between the intermediate sprocket wheel and the traction wheels.

5. A plant chopper comprising traction wheels, a main frame carried by said traction wheels, a rearwardly extending main chopper frame pivotally mounted on the main frame on a transverse axis to swing independent of the main vehicle frame, a supplemental chopper frame pivotally mounted on the rearward extension of the main chopper frame on a longitudinal axis, a rotary chopper carried by the lower end of the supplemental chopper frame, and intermediate gearing between the traction wheels and rotary chopper.

In witness whereof, I, have hereunto set my hand and seal at Indianapolis, Indiana, this third day of May, A. D. one thousand nine hundred and eleven.

JESSE C. TOWELL. [L. S.]

Witnesses:
ARTHUR H. TOWELL,
FRANK A. FAHLE.